United States Patent
Lee et al.

(10) Patent No.: US 9,670,084 B2
(45) Date of Patent: Jun. 6, 2017

(54) METHOD FOR TREATING WASTEWATER CONTAINING TETRAMETHYLAMMONIUM HYDROXIDE AND AMMONIUM NITROGEN

(71) Applicants: LEADERMAN & ASSOCIATES CO., LTD., Taipei (TW); NATIONAL CHIAO TUNG UNIVERSITY, Hsinchu (TW)

(72) Inventors: Der-Ming Lee, Taipei (TW); Ming-Kuei Chiang, Taipei (TW); Chin-Te Chen, Taipei (TW); Keng-Chuan Sung, Taipei (TW); Chien-Ju Lan, Taipei (TW); Jih-Gaw Lin, Hsinchu (TW); Ying-Chang Liang, Hsinchu (TW)

(73) Assignees: Leaderman & Associates Co., Ltd., Taipei (TW); National Chiao Tung University, Hsinchu (TW)

( * ) Notice: Subject to any disclaimer, the term of this patent is extended or adjusted under 35 U.S.C. 154(b) by 448 days.

(21) Appl. No.: 14/198,111

(22) Filed: Mar. 5, 2014

(65) Prior Publication Data
US 2015/0076060 A1   Mar. 19, 2015

(30) Foreign Application Priority Data

Sep. 17, 2013 (TW) .............................. 102133729 A
Nov. 18, 2013 (TW) .............................. 102141956 A

(51) Int. Cl.
C02F 3/00   (2006.01)
C02F 3/30   (2006.01)
(Continued)

(52) U.S. Cl.
CPC .............. *C02F 3/307* (2013.01); *C02F 3/301* (2013.01); *C02F 3/341* (2013.01); *C02F 3/348* (2013.01);
(Continued)

(58) Field of Classification Search
CPC .......... C02F 3/307; C02F 3/301; C02F 3/109; C02F 3/1263; C02F 3/34; C02F 3/341;
(Continued)

(56) References Cited

U.S. PATENT DOCUMENTS

| | | | |
|---|---|---|---|
| 4,537,682 A * | 8/1985 | Wong-Chong | C02F 3/1231 210/611 |
| 8,273,246 B2 * | 9/2012 | Chang | C02F 3/104 210/605 |
| 2008/0245730 A1 * | 10/2008 | Tokutomi | C02F 3/006 210/605 |

FOREIGN PATENT DOCUMENTS

TW    201029938 A1   8/2010
TW    201031599      9/2010
(Continued)

OTHER PUBLICATIONS

D. Achlesh et al., "Partial nitrification and anammox process: A method for high strength optoelectronic industrial wastewater treatment," *Water Research*, 47, pp. 2929-2937, Feb. 4, 2013.
(Continued)

*Primary Examiner* — Nam Nguyen
*Assistant Examiner* — Julia Wun
(74) *Attorney, Agent, or Firm* — Muncy, Geissler, Olds & Lowe, P.C.

(57) ABSTRACT

A method for treating wastewater containing TMAH and ammonium nitrogen includes the steps of (a) introducing a first solution which contains ammonium nitrogen but no TMAH into a single reactor with microorganisms comprising nitrifying bacteria and anammox bacteria, and denitrifying the first solution by the microorganisms under a dissolved oxygen concentration ranging from 0.1-0.5 mg/L and a pH value of 7-8; (b) when the denitrification efficiency reaches a steady state, introducing a second solution which contains ammonium nitrogen and TMAH and has a concen-
(Continued)

tration of TMAH lower than 60 mg/L into the reactor; and (c) gradually increasing the concentration of TMAH in the solution to be added into the reactor for several times whenever the denitrification efficiency reaches a steady state. Accordingly, the inhibition of TMAH to the anammox bacteria can be significantly decreased, and both TMAH and the ammonium nitrogen can be treated simultaneously.

6 Claims, 4 Drawing Sheets

(51) Int. Cl.
| C02F 3/34 | (2006.01) |
| C02F 101/16 | (2006.01) |
| C02F 103/34 | (2006.01) |
| C02F 3/10 | (2006.01) |
| C02F 3/12 | (2006.01) |
| C02F 101/38 | (2006.01) |

(52) U.S. Cl.
CPC ............ *C02F 3/109* (2013.01); *C02F 3/1263* (2013.01); *C02F 2101/16* (2013.01); *C02F 2101/38* (2013.01); *C02F 2103/346* (2013.01); *C02F 2209/06* (2013.01); *C02F 2209/22* (2013.01); *C02F 2301/08* (2013.01); *Y02W 10/15* (2015.05)

(58) Field of Classification Search
CPC .. C02F 3/348; C02F 2101/38; C02F 2101/16; C02F 2209/22; C02F 2209/06; C02F 2103/346; C02F 2301/08; Y02W 10/15
USPC ................................ 210/610, 605, 630, 903
See application file for complete search history.

(56) References Cited

FOREIGN PATENT DOCUMENTS

| TW | 201313625 A1 | 4/2013 |
| TW | 201345844 A1 | 11/2013 |

OTHER PUBLICATIONS

H. Ishigaki, "Example of reduction of organic wastewater from semi-conductor factory by means of biochemical recycling system," *Technical Review*, pp. 14-17, Jul. 31, 2004.

H.L. Lin et al., "Use of Tw-Stage Biological Process in Treating Thing Film Transistor Liquid Crystal Display Wastewater of Tetramethylammonium Hydroxide," Sustain. Environ., Res., 21(3), 2011, pp. 155-160.

S.H. Hwang, "A Study on the Degradation of TMAH-containing Wastewater by Biological Treatment," May 10, 2010, NTUR:Item 246246/181597, pp. 1-70, http://ntur.lib.ntu.edu.tw/handle/246246/181597.

* cited by examiner

METHOD FOR TREATING WASTEWATER CONTAINING TETRAMETHYLAMMONIUM HYDROXIDE AND AMMONIUM NITROGEN

BACKGROUND OF THE INVENTION

1. Field of the Invention

The present invention relates generally to a method and a device for treating a wastewater containing nitrogenous compound and more particularly, to a method and a device for treating a wastewater containing both tetramethylammonium hydroxide (TMAH) and ammonium nitrogen by biological treatment.

2. Description of the Related Art

Semiconductor or electro-optical industry usually produces a lot of industrial wastewater containing high concentration ammonium nitrogen and organic nitrogen, such as a strong alkaline TMAH which is often used as a developer liquid. Thus, there is a need to provide a method that can effectively remove the nitrogenous compound contained in the wastewater.

In conventional activated sludge process, a higher hydraulic retention time (HRT) and a higher dissolved oxygen (DO) content are required for degradation of TMAH. Therefore, the treating efficiency is low and the energy consumption is high.

When the nitration-denitration reaction is further proceeded in the activated sludge tank, the ammonium nitrogen and non-degraded TMAH may exist simultaneously in the reaction system. Under such circumstances, the activity of the anammox bacteria can be greatly inhibited by TMAH, resulting in the decrease of the denitration (denitrification) efficiency of the anammox bacteria.

In light of the above, the conventional biological method for treating the wastewater containing both TMAH and ammonium nitrogen has to be divided into at least two individual steps. TMAH degradation is the first step to degrade TMAH into ammonium nitrogen, and denitrification is the second step to degrade the ammonium nitrogen into nitrogen gas. Therefore, more than two reactors are required to proceed with the above-mentioned steps respectively, undesirably increasing the system fabrication cost and enhancing the complexity of operation and maintenance.

SUMMARY OF THE INVENTION

It is therefore one objective of the present invention to provide a method and a device for treating a wastewater containing tetramethylammonium hydroxide (TMAH) and ammonium nitrogen in a single reactor.

In order to achieve the above-mentioned and other objectives, a method for treating a wastewater containing TMAH and ammonium nitrogen provided by the present invention includes the steps of: (a) introducing a first solution, which contains ammonium nitrogen but does not contain TMAH, into a single reactor with microorganisms including nitrifying bacteria and anammox bacteria, and denitrifying the first solution by the microorganisms under a dissolved oxygen concentration ranging from 0.1 to 0.5 mg/L and a pH value ranging between 7 and 8; (b) when a denitrification efficiency of the reactor reaches a steady state, introducing a second solution, which contains the ammonium nitrogen and TMAH and has a concentration of TMAH lower than 60 mg/L, into the reactor; (c) when the denitrification efficiency reaches a steady state again, introducing a third solution, which contains the ammonium nitrogen and TMAH and has a concentration of TMAH higher than that of the solution previously introduced, into the reactor; repeating this step for several times.

In order to achieve the above-mentioned and other objectives, a device for treating a wastewater containing TMAH and ammonium nitrogen provided by the present invention includes a reactor. In the reactor, the dissolved oxygen concentration ranges from 0.1 to 0.5 mg/L and the pH value ranges between 7 to 8, and TMAH and the ammonium nitrogen are removed simultaneously by nitrifying bacteria, anammox bacteria, and heterotrophic denitrifying bacteria. The ammonium nitrogen is oxidized into nitrite nitrogen by the nitrifying bacteria, the ammonium nitrogen and the nitrite nitrogen are converted into nitrogen gas and nitrate nitrogen by the anammox bacteria, and the nitrate nitrogen and TMAH or the carbon-containing degradation products of TMAH are converted into nitrogen gas by the heterotrophic denitrifying bacteria.

In the prior research, it was found that TMAH can significantly inhibit the denitrification of the anammox bacteria; however, the inventor of the present invention surprisingly find that the aforesaid inhibition can be mitigated significantly through the method provided by the present invention by means of adding TMAH with lower concentration in the early stage and then gradually increasing the concentration of TMAH in the solution to be introduced in the reactor later on, in such a way an unexpected effect that TMAH and the ammonium nitrogen can be effectively treated simultaneously in the single reactor is achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
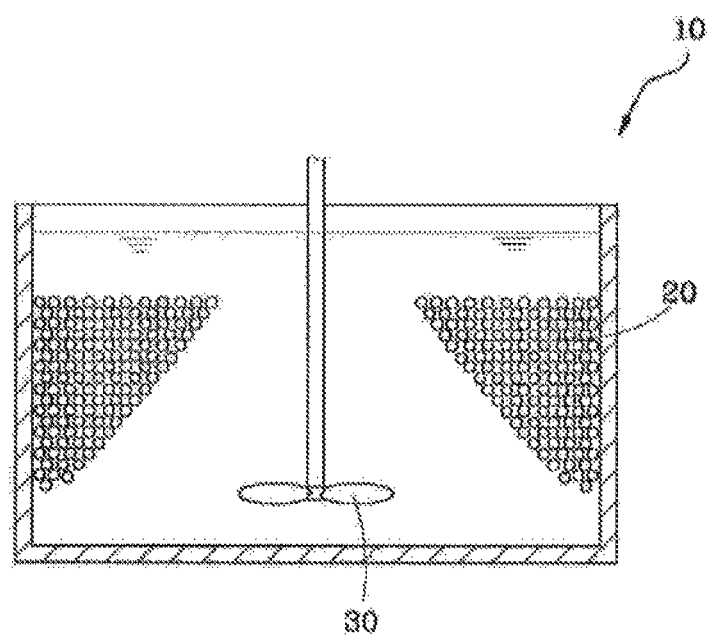
FIG. 1 is a schematic diagram of a device for treating a wastewater containing TMAH and ammonium nitrogen of a preferred embodiment of the present invention.

The present invention relates to a method for treating a wastewater containing tetramethylammonium hydroxide (TMAH) and ammonium nitrogen. The method includes the steps of introducing a first solution, which contains ammonium nitrogen but does not contain TMAH, into a single reactor with microorganisms including nitrifying bacteria and anammox bacteria, and denitrifying the first solution by the microorganisms under a dissolved oxygen concentration ranging from 0.1 to 0.5 mg/L and a pH value ranging between 7 and 8. Under the condition of low dissolved oxygen concentration, a part of the ammonium nitrogen of the first solution is oxidized into nitrite nitrogen by the nitrifying bacteria through partial nitrification of the ammonium nitrogen. The resulting nitrite nitrogen and the residual ammonium nitrogen are converted into nitrogen gas by the anammox bacteria. Such a process is called as a denitrification reaction in the present invention.

When the denitrification efficiency of the reactor reaches a steady state, a second solution, which contains TMAH and the ammonium nitrogen, is added into the reactor. The initial concentration of TMAH to be added into the reactor should be less than 60 mg/L since the denitrification reaction is significantly inhibited by a high concentration of TMAH.

When the denitrification efficiency reaches a steady state again, a third solution, which contains TMAH and the ammonium nitrogen and has a concentration of TMAH higher than that of the solution previously introduced, is introduced into the reactor. Such step is repeated for several times, that is, the concentration of TMAH in the third solution to be introduced is gradually increased until it is higher than a predetermined value. Specifically, for the adjustment of the concentration of TMAH in the third solution, if the concentration of TMAH in the solution previously added to the reactor is less than 300 mg/L, the concentration of TMAH in the third solution subsequent added to the reactor should be increased without exceeding three times the concentration of TMAH in the solution previously added to the reactor. More preferably, the concentration of TMAH in the third solution subsequent added to the reactor is two to three times the concentration of TMAH in the previously-introduced solution in order to reduce the number of repetition of TMAH concentration adjustment process. On the other hand, if the concentration of TMAH in the solution previously added is already higher than 300 mg/L, the concentration of TMAH in the solution subsequent added to the reactor should be increased without exceeding two times the concentration of TMAH in the solution previously added. It is noted that an excessive increasing rate of the concentration of TMAH may impose burden on the microorganisms and cause significant inhibition of TMAH to the anammox bacteria, such that the adjustment of the concentration of TMAH in the third solution is preferred in accordance with the above-mentioned manner.

The present invention also provides a device for treating a wastewater containing tetramethylammonium hydroxide (TMAH) and ammonium nitrogen, which can be applied to the method of the present invention. As shown in FIG. 1, the device includes a reactor 10 filled with activated sludge containing the above-mentioned microorganisms. A plurality of carriers 20 for the attachment and growth of the microorganisms are further disposed in the reactor 10, and preferably are arranged in annular form. A stirring member 30 may further disposed in the bottom of the reactor 10 so as to promote the circular flow of the wastewater in the reactor 10 and to agitate the activated sludge in the bottom of the reactor 10, thereby accelerating the proceeding of the reaction.

In the present invention, the reactor 10 may be designed to be a sequencing-batch reactor for conducting a cyclic process which includes a feeding step, a reaction step, a settling step and a decanting step. In the feeding step, the first solution, the second solution or the third solution, subject to the steps of the previous method of the present invention, is introduced in the reactor 10. In the reaction step, the introduction of the solution in the reactor 10 is stopped. In the settling step, the stirring member 30 is stopped such that the activated sludge containing the microorganisms starts to settle and a clear supernatant is then obtained. In the decanting step, at least a part of the supernatant is discharged from the reactor 10.

The time for performing the aforesaid processes can be adjusted according to the actual need. For example, the time for the feeding step can be increased to mitigate the load shock to the microorganisms caused by supplying a high-concentration wastewater within a short time. It is also possible that, when the concentration of the nitrogenous compounds contained in the wastewater to be supplied is similar to that in the residual solution of the reactor 10, or when only a little amount of the wastewater is supplied to the reactor 10, the time for the feeding step can be reduced. In addition, the time for the reaction step is subject to the required time that the nitrogen substance contained in the wastewater can be adequately digested by the microorganisms. However, because the digestion of the microorganisms is continuously proceeded in the other processes (although the reaction rate may be different), the time for the reaction process can be adjusted subject to the time for the other processes. For instance, if the predetermined time for the feeding step is long, the time for the reaction step can be shortened to reduce the hydraulic retention time (HRT).

The "denitrification efficiency" as mentioned in the present invention indicates the efficiency for removing total nitrogen contained in the solution or wastewater. The aforesaid total nitrogen includes ammonium nitrogen, nitrite nitrogen and nitrate nitrogen. The denitrification efficiency "reaches a steady state" as mentioned in the present invention indicates that the change of the denitrification efficiency during a period of time is lower than a deviation rate. The period of time and the deviation rate are set in accordance with the actual need, and generally the period of time is between 2 to 10 days, and the deviation rate is between ±1% to ±10%. In one embodiment of the present invention, the steady state is defined as a state in which the difference of the denitrification efficiency is in a range of −5% to 5% within 7 days.

When the concentration of TMAH in the third solution is higher than a predetermined value, which can be adjusted subject to actual needs, a real wastewater containing both TMAH and the ammonium nitrogen can be introduced into the reactor 10. For an example of the predetermined value, the amount of TMAH contained in the real wastewater can be used as a reference value. Because the amount of TMAH contained in the real wastewater is usually not a constant value but varies within a range, the predetermined value is preferably equal to the lower limit value of TMAH contained in the real wastewater, more preferably equal to the average value of TMAH contained in the real wastewater, and most preferably equal to the upper limit value of TMAH contained in the real wastewater. Subject to actual needs, the predetermined value can also be higher than the upper limit value of TMAH contained in the real wastewater. Furthermore, in order to reduce the time for cultivating the microorganisms, the predetermined value also can be slightly lower than the lower limit value of TMAH contained in the real wastewater if appropriate.

The prior research has indicated that the introduction of TMAH may inhibit the denitrification reaction of anammox bacteria, and the higher the concentration of TMAH, the greater the inhibition of the denitrification reaction. Nevertheless, the aforesaid inhibition can be significantly mitigated through the method provided by the present invention. Specifically, the initial concentration of TMAH of the second solution is controlled to be no more than 60 mg/L, and the concentration of TMAH of the solution subsequently introduced is gradually increased whenever the denitrification efficiency reaches a steady state. In this way, compared to the condition that TMAH is introduced in a high concentration in a single step, the inhibition of the denitrification efficiency caused by TMAH in the present invention is significantly controlled and TMAH can be gradually degraded, such that both TMAH and the ammonium nitrogen contained in the wastewater can be effectively removed in the single reactor eventually, thereby avoiding the use of two separate reactors for the treatment of TMAH and the ammonium nitrogen respectively.

In order to verify the inhibition of the denitrification efficiency caused by TMAH, the following experiment is performed.

For the chemicals used in the present experiment, it includes ammonium chloride solution ($NH_4Cl$, 2300 mg-N/L), sodium nitrite solution ($NaNO_2$, 2300 mg-N/L), and phosphate buffer solution comprising 0.14 g/L of potassium phosphate monobasic ($KH_2PO_4$), 0.75 g/L of potassium phosphate dibasic ($K_2HPO_4$), and 0.5 g/L of potassium bicarbonate ($KHCO_3$). The aforesaid chemicals were purged with argon gas for 10 minutes to remove oxygen. Stock solutions of TMAH (2500 mg/L) was also prepared. The activated sludge containing nitrifying bacteria and anammox bacteria was used in the present experiment, and was rinsed twice with the phosphate buffer solution to eliminate the organic and nitrogenenous compound. A plurality of serum vials with total volume of 67 mL were provided, and each vial was filled with $NH_4Cl$ solution of 1.7 ml, $NaNO_2$ solution of 1.7 ml and the 53.6 ml of prepared sludge for blank. In this way, both the concentration of ammonium chloride and sodium nitrite in each vial were 70 mg-N/L. In order to test the inhibition of denitrification efficiency caused by TMAH, TMAH solutions with different concentrations as showed in Table 1 were added to the vials respectively. In this way, the liquid volume was 57 mL and the vapor volume was 10 mL in each vial. Subsequently, argon gas was purged into the headspace of the vials to expel oxygen and ensure the initial pressure inside the vials was maintained at atmospheric pressure. The vials were then sealed and shook at 125 rpm and 25° C., and the pressure in the headspace of the vials was measured by a pressure gauge for 2 to 4 hours. The pressure was recorded every hour and the test was conducted in duplicate.

TABLE 1

| Concentration of ammonium nitrogen (mg/L) | Concentration of nitrite nitrogen (mg/L) | Concentration of TMAH (mg/L) |
| --- | --- | --- |
| 70 | 70 | 0, 195, 325, 455, 520, 650, 780 |

Because nitrogen gas is generated during the anaerobic ammonium oxidation (anammox) reaction by the anammox bacteria, the denitrification efficiency can be determined by the generation rate of the nitrogen gas which is obtained through the following equation (1):

$$\frac{dN_2}{dt} = \frac{\alpha \times V_G}{R \times T} (\text{mol } N_2 hr^{-1}) \quad (1)$$

In the equation (1), $\alpha$ is the slope of the pressure increase in the vial along the time (atm), $V_G$ is the volume of gas phase (0.01 L), R is the ideal gas constant 0.0820575 (atm 1 $mol^{-1}$ $K^{-1}$) and T is the temperature (K).

The specific anammox activity (SAA), which represents the activity of the anammox reaction caused by anammox bacteria, can be calculated through the following equation (2):

$$SAA = \frac{\frac{dN_2}{dt} \times 28}{X \times V_L} \times 24 \ (g \ N_2-N \ (g \ VSS)^{-1} d^{-1}) \quad (2)$$

In the equation (2), the number 28 represents the molecular weight of nitrogen gas and the unit of which is g N/mol; the number 24 represents 24 hours a day; X represents the biomass concentration in the vial and the unit of which is g VSS/L; and $V_L$ represents the liquid volume in the vial and the value of which is 0.057 L.

Figure 2:
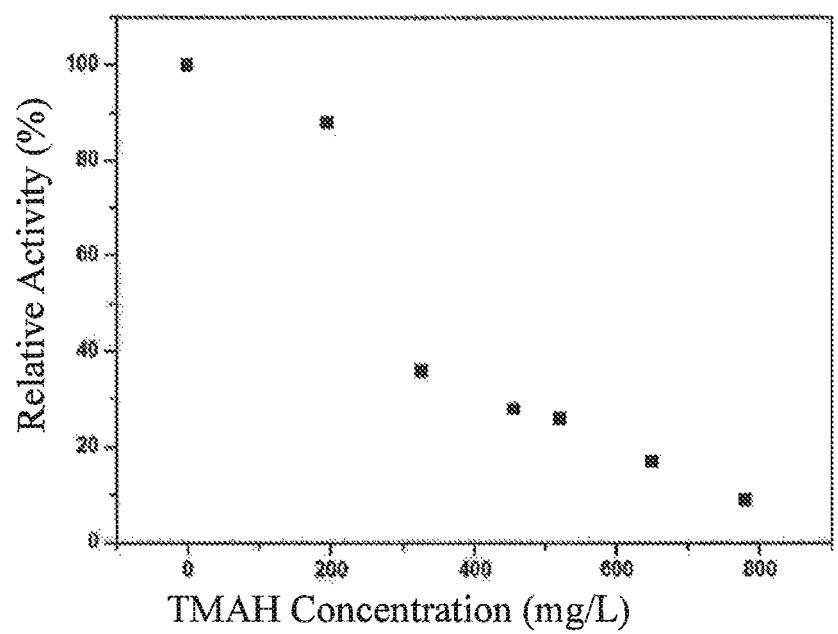
FIG. 2 is a plot showing the relationship of relative activity of the specific anammox activity versus concentration of TMAH.

The sample with no TMAH containing is used as a comparison basis (100%) in the present test. The ratio of the SSA of the sample with TMAH to the SSA of the sample without TMAH represents the relative activity. Referring to FIG. 2 for the relationship of the relative activity of the SSA versus the concentration of TMAH, it is found that the higher the concentration of TMAH, the lower the relative activity of the SSA. When the concentration of TMAH reaches 780 mg/L, the relative activity of the SSA is lower than 10%. This result indicates that the introduction of high concentration TMAH into a system for treating ammonium nitrogen with anammox bacteria leads to significant decrease of the activity of anammox bacteria.

However, the inhibition to the anammox bacteria by the high concentration of TMAH can be greatly mitigated in the present invention.

In a preferred embodiment of the present invention, the ammonium nitrogen solution containing TMAH was treated by partial nitrification reaction, anammox reaction and denitrification reaction simultaneously. In the system of the present invention, a part of ammonium nitrogen was partially nitrified to nitrite nitrogen by nitrifying bacteria under low dissolved oxygen (DO) condition, and the residual ammonium nitrogen and the obtained nitrite nitrogen were converted into nitrogen gas and nitrate nitrogen respectively by anammox bacteria through anammox reaction. The nitrification reaction and the anammox reaction were performed simultaneously in the reactor. The added TMAH and the nitrate nitrogen were converted into nitrogen gas by heterotrophic denitrifying bacteria through denitrification reaction.

In the initial establishment of the present system, a synthetic wastewater containing ammonium nitrogen but no TMAH was introduced into the reactor. The composition of the synthetic wastewater was shown in the following Table 2.

TABLE 2

| Composition of synthetic wastewater | mg/L | Composition of trace elements | mg/L |
| --- | --- | --- | --- |
| $NH_4^+$—N | 400-600 | EDTA | 1500 |
| $KH_2PO_4$ | 25 | $CoCl_2 \cdot 6H_2O$ | 240 |

TABLE 2-continued

| Composition of synthetic wastewater | mg/L | Composition of trace elements | mg/L |
|---|---|---|---|
| $CaCl_2 \cdot 2H_2O$ | 300 | $MnCl_2 \cdot 4H_2O$ | 990 |
| $MgSO_2 \cdot 7H_2O$ | 200 | $CuSO_4 \cdot 5H_2O$ | 250 |
| $FeSO_4$ | 6.25 | $NaMoO_4 \cdot 2H_2O$ | 220 |
| trace elements | 1 (mL/L) | $ZnSO_4 \cdot 7H_2O$ | 430 |
| | | $NaSeO_4 \cdot 7H_2O$ | 210 |
| | | $H_3BO_4 \cdot 7H_2O$ | 14 |
| | | $NiCl_2 \cdot 2H_2O$ | 190 |

In the present embodiment, a sequencing-batch reactor with a working volume of 18 L was used to carry out the cyclic process including a feeding step for 12 hours, a reaction step for 11 hours, a settling step for half hour, and a decanting step for half hour. That is to say, a cycle requires 24 hours. In addition, a plurality of spherical carriers were arranged annularly in the reactor. For the reactor, the temperature was maintained at 25° C., the pH value was controlled in a range of 7 to 8, and the dissolved oxygen concentration was controlled in a range of 0.1 to 0.5 mg/L.

The treatment of the present embodiment was operated for 392 days and can be divided into eight stages as shown in the following table 3.

TABLE 3

| | Stage | | | | | | | |
|---|---|---|---|---|---|---|---|---|
| | 1 | 2 | 3 | 4 | 5 | 6 | 7 | 8 |
| Period (day) | 1-161 | 162-246 | 247-260 | 261-316 | 317-341 | 342-358 | 359-372 | 373-392 |
| | (161) | (85) | (14) | (56) | (25) | (17) | (14) | (20) |
| Ammonium nitrogen concentration of inflow (mg/L) | 400-600 | 660-850 | 900 | 900 | 900 | 900 | 900 | 900 |
| Hydraulic retention time (day) | 4 | 3 | 3 | 3 | 3 | 3 | 3 | 3 |
| Nitrogen loading rate (g/m$^3 \cdot$ d) | 100-150 | 220-283 | 300 | 300 | 300 | 300 | 300 | 300 |
| TMAH concentration of inflow (mg/L) | | | 33 | 100 | 200 | 400 | 700 | 1000 |
| TMAH concentration of inflow (mg-N/L) | | | 5 | 15 | 31 | 62 | 108 | 154 |

For stages 1 and 2, the inflow contains ammonium nitrogen but no TMAH, in which the inflow of stage 1 is the synthetic wastewater shown in table 2, and was introduced into the reactor. In stage 2, the inflow with higher concentration of ammonium nitrogen was introduced into the reactor and the hydraulic retention time was reduced so as to enhance the activity of the anammox bacteria.

For stage 3 to stage 8, TMAH was added into the inflow. The concentration of TMAH contained in the inflow of stage 3 was 33 mg/L, and the concentrations of TMAH contained in the inflows of stages 4 to 8 are gradually increased.

Figure 3:
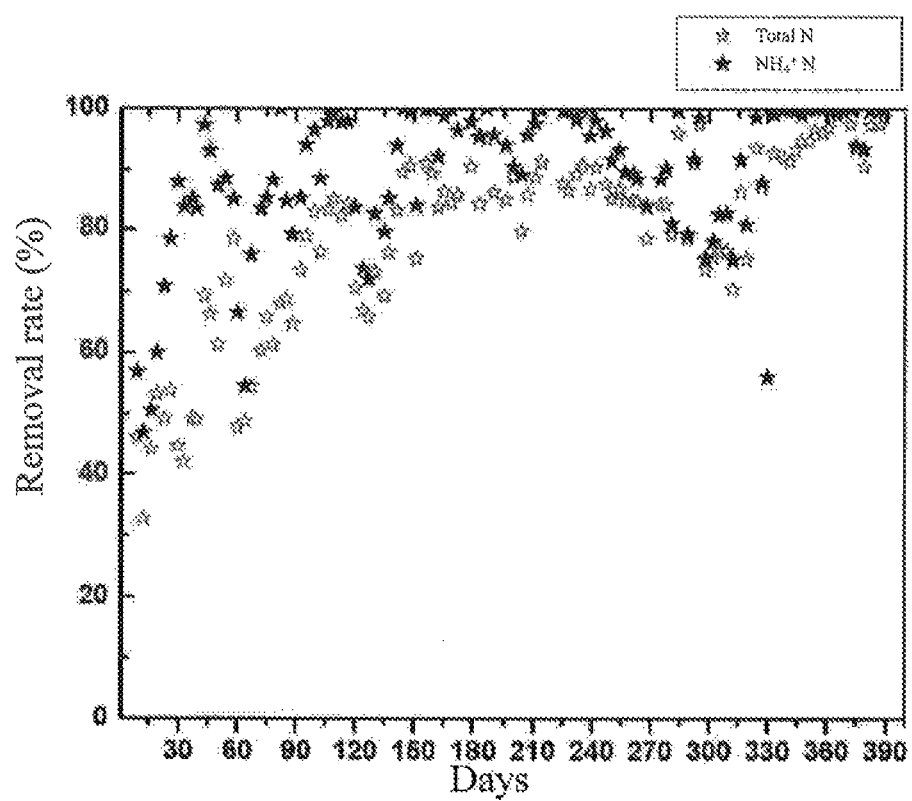
FIG. 3 is a plot showing the removal rate of ammonium nitrogen and the removal rate of total nitrogen from stage 1 to stage 8 of the preferred embodiment of the present invention.

FIG. 3 shows the removal rate of ammonium nitrogen and the removal rate of total nitrogen from stage 1 to stage 8 of the present embodiment of the present invention. When TMAH is added into the reactor, i.e. from day 247 (stage 3), it is observed that both the removal rate of ammonium nitrogen and the removal rate of total nitrogen were decreased. However, because the initial concentration of TMAH contained in the inflow is relative low, the slight inhibition of anammox reaction can be tolerated. From day 330, it is observed that the removal rate of ammonium nitrogen returns to nearly 100%. From day 350 to day 392, although the concentration of TMAH contained in the inflow is between 400 to 1000 mg/L, the removal rate of total nitrogen can be maintained at a rate above 97%; therefore, it is shown that the anammox reaction is no longer inhibited by high concentration of TMAH at this time.

Figure 4:
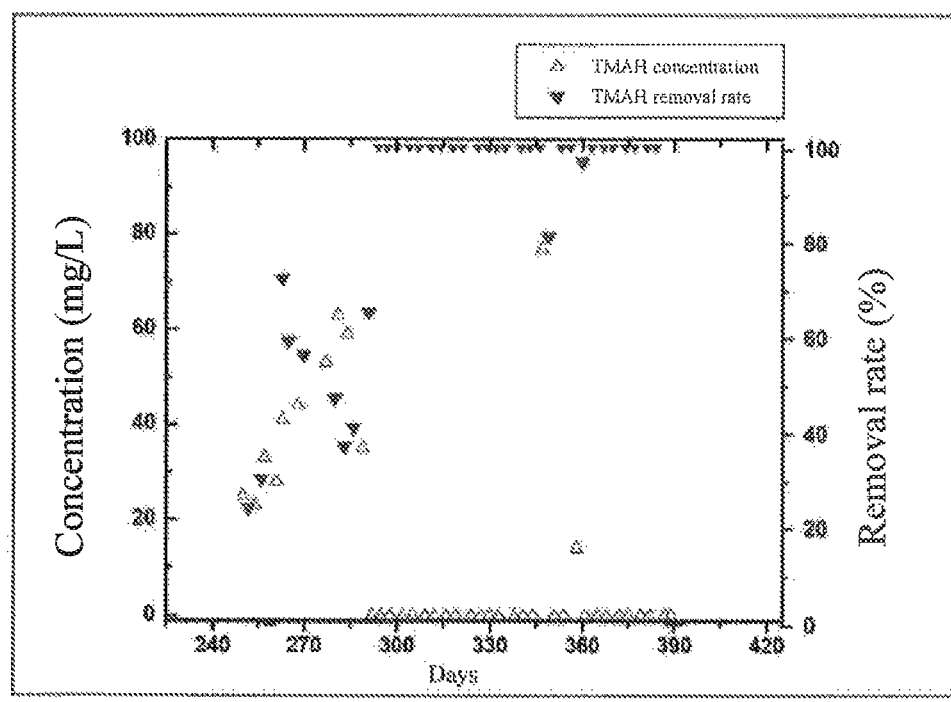
FIG. 4 is a plot showing the concentration of TMAH of the outflow and the removal rate of TMAH from stage 3 to stage 8 of the preferred embodiment of the present invention.

In addition, FIG. 4 shows TMAH concentration of the outflow and the removal rate of TMAH from stage 3 to stage 8 of the present embodiment of the present invention. When TMAH is added into the reactor in the early stages, it is observed that TMAH remains at a low concentration in the outflow; however, from day 292, the removal rate of TMAH has reached nearly 100%. It is found by the inventor that this is because the heterotrophic denitrifying bacteria has naturally existed in the activated sludge in the reactor and TMAH contained in the inflows introduced during stage 3 to stage 8 may be used as carbon source by the heterotrophic denitrifying bacteria to conduct denitrification reaction, and thus the heterotrophic denitrifying bacteria can be gradually proliferated in the reactor.

Further, it is also found by the inventor that because TMAH is contained in the reactor during stage 3 to stage 8, aerobic degradation bacteria of TMAH such as *Paracoccus kocurii* can also be found in the reactor, such that TMAH is degraded by the aerobic degradation bacteria of TMAH into formaldehyde and ammonium nitrogen. In this way, not only TMAH but also the carbon-containing degradation product of TMAH, which includes formaldehyde and other carbon-containing intermediates, can be used as the carbon source for the denitrification reaction, resulting in that the nitrate nitrogen can be converted into nitrogen gas. In addition to *Paracoccus kocurii*, the aerobic degradation bacteria of TMAH such as *Nocardia* sp., *Mycobacterium* sp., *Pseudomonas aminovorans*, and *Methylobacterium* strains may also exist in the reactor.

In conclusion, in the system of the present invention, ammonium nitrogen is nitrified to nitrite nitrogen by nitrifying bacteria, ammonium nitrogen and nitrite nitrogen are converted into nitrogen gas and nitrate nitrogen by anammox bacteria, TMAH is degraded into ammonium nitrogen and formaldehyde by aerobic degradation bacteria of TMAH, and nitrate nitrogen and TMAH (or the carbon-containing degradation product of TMAH) are converted into nitrogen gas and other inorganic carbon compound by heterotrophic denitrifying bacteria, such that the removal rate of TMAH and the removal rate of total nitrogen can be significantly increased.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for treating a wastewater containing tetramethylammonium hydroxide (TMAH) and ammonium nitrogen, the method comprising the steps of:
   (a) introducing a first solution, which contains ammonium nitrogen but does not contain TMAH, into a single reactor with microorganisms comprising nitrifying bacteria and anammox bacteria, and denitrifying the first solution by the microorganisms under a dissolved oxygen concentration ranging from 0.1 to 0.5 mg/L and a pH value ranging between 7 and 8;
   (b) when a denitrification efficiency of the reactor reaches a steady state, introducing a second solution, which contains ammonium nitrogen and TMAH and has a concentration of TMAH lower than 60 mg/L, into the reactor; and
   (c) when the denitrification efficiency reaches a steady state again, introducing a third solution, which contains the ammonium nitrogen and TMAH and has a concentration of TMAH higher than that of the solution previously introduced, into the reactor; repeating this step, even when TMAH remains in an outflow of the reactor, until an inflow having a concentration of TMAH of 1000 mg/L is introduced into the reactor.

2. The method of claim 1, wherein in the step (c), if the concentration of TMAH in the solution previously introduced into the reactor is less than 300 mg/L, the concentration of TMAH in the solution subsequent introduced into the reactor is increased without exceeding three times the concentration of TMAH in the solution previously introduced to the reactor; and if the concentration of TMAH in the solution previously introduced into the reactor is higher than 300 mg/L, the concentration of TMAH in the solution subsequent introduced into the reactor is increased without exceeding two times the concentration of TMAH in the solution previously introduced into the reactor.

3. The method of claim 2, wherein in the step (c), if the concentration of TMAH in the solution previously introduced into the reactor is less than 300 mg/L, the concentration of TMAH in the solution subsequent introduced into the reactor is two to three times the concentration of TMAH in the solution previously introduced into the reactor.

4. The method of claim 1, wherein a plurality of carriers for the attachment of the microorganisms are disposed in the reactor.

5. The method of claim 1, wherein after the step (c), the microorganisms in the reactor further comprises heterotrophic denitrifying bacteria and aerobic degradation bacteria of TMAH.

6. The method of claim 1, wherein the reactor is a sequencing-batch reactor containing an activated sludge for conducting a cyclic process which includes:
   a feeding step in which one of the solutions is introduced in the reactor;
   a reaction step in which the solution is stopped from entering the reactor;
   a settling step in which the activated sludge containing the microorganisms starts to settle and a clear supernatant is then obtained; and
   a decanting step in which at least a part of the supernatant is discharged from the reactor.

* * * * *